(12) United States Patent
Dressel

(10) Patent No.: US 7,215,056 B2
(45) Date of Patent: May 8, 2007

(54) ELECTRICAL MACHINE

(75) Inventor: Gerhard Dressel, Schwarzenbruck (DE)

(73) Assignee: Siemens Aktiengesellschaft, München (DE)

( * ) Notice: Subject to any disclaimer, the term of this patent is extended or adjusted under 35 U.S.C. 154(b) by 9 days.

(21) Appl. No.: 10/540,199

(22) PCT Filed: Dec. 8, 2003

(86) PCT No.: PCT/DE03/04037

§ 371 (c)(1),
(2), (4) Date: Jun. 20, 2005

(87) PCT Pub. No.: WO2004/057735

PCT Pub. Date: Jul. 8, 2004

(65) Prior Publication Data

US 2006/0202585 A1    Sep. 14, 2006

(30) Foreign Application Priority Data

Dec. 20, 2002 (DE) ............................... 102 60 282

(51) Int. Cl.
*H02K 17/16* (2006.01)

(52) U.S. Cl. .................................................. 310/211

(58) Field of Classification Search ................ 310/197, 310/207, 211
See application file for complete search history.

(56) References Cited

U.S. PATENT DOCUMENTS

| | | | | |
|---|---|---|---|---|
| 1,015,912 A | * | 1/1912 | Starker | 310/211 |
| 1,371,233 A | * | 3/1921 | Fries | 310/211 |
| 1,645,296 A | | 10/1927 | Rüdenberg | |
| 2,857,539 A | | 10/1958 | Limpel | |
| 2,971,106 A | | 2/1961 | Westphalen | |
| 4,399,949 A | * | 8/1983 | Penn et al. | 242/433 |
| 4,761,602 A | * | 8/1988 | Leibovich | 318/816 |
| 5,530,310 A | | 6/1996 | Sauer et al. | |

FOREIGN PATENT DOCUMENTS

| | | |
|---|---|---|
| DE | 555 837 | 8/1932 |
| DE | 870 879 | 3/1953 |
| DE | 11 50 752 | 6/1963 |
| DE | 25 32 338 A | 2/1977 |
| JP | 57 148563 | 9/1982 |
| JP | 08 009606 A | 1/1996 |

* cited by examiner

*Primary Examiner*—Burton Mulllins
(74) *Attorney, Agent, or Firm*—Henry M. Feiereisen

(57) ABSTRACT

In order to prevent, among other things, fatigue failures in squirrel-cage rotors of electrical machines, the invention provides that the squirrel-cage winding is comprised of flexible conductors.

30 Claims, 2 Drawing Sheets

ELECTRICAL MACHINE

BACKGROUND OF THE INVENTION

The invention relates to an electric machine with a squirrel-cage rotor.

Asynchronous machines typically have rotors in form of a cage winding, whereby a respective rod is inserted in each of the slots, with the rods being connected at their respective end faces on the rotor by cage rings. Rods and cage rings are fabricated from aluminum or aluminum alloys by die casting, and have a higher resistance. However, copper, bronze or brass can also be used as electric conductors. The solid rods of the cage winding are typically inserted in the rotor without insulation and joined with the cage rings by soldering.

Disadvantageously, the cage rods have to be connected with the cage rings in a separate manufacturing step. Moreover, the projection of the rods at the end faces of the rotor does not contribute to torque generation. In addition, vibration fatigue frequently occurs due to the relatively rigid construction of the squirrel-cage, in particular at the solder joints.

SUMMARY OF THE INVENTION

It is therefore an object of the invention to provide a squirrel-cage for an electric machine, which obviates the aforementioned disadvantages.

The object is solved in that the squirrel-cage rotor has a cage winding made of flexible conductors, in particular stranded conductors.

This eliminates vibration fatigue and shortens the projection of the conductors over the lamination stack of the squirrel-cage rotor. The required short-circuit or cage connection is advantageously provided within the slots by electrically contacting, in particular, two electric conductors, in particular stranded conductors, placed in a slot in opposite directions. Electric contact is made, for example, by pressing.

The slots can be closed, semi-open or open. In particular with open slots, precautions have to be taken at least over certain sections for absorbing the centrifugal forces of the flexible conductors in the slot region.

Advantageously, the proximity effect can be reduced by implementing the electric conductors as flexible conductors, with a plurality of elements, which include individual bare wires that can be stranded or bunched. The cross-section of the stranded wire as well as of its filaments can have any imaginable geometric shapes, such as quadrilateral, rectangular, square, triangular or round.

The cross section over the length of a stranded wire or of a filament can be given different shapes by suitable processes.

The projection of the meandering conductors over the end faces of the squirrel-cage rotor according to the invention is relatively short. Because the electric conductors, in particular the stranded conductors, are flexible, holding elements are provided in one exemplary embodiment for absorbing the centrifugal forces during operation of the electric machine. These holding elements are made of a high-strength, electrically insulating material suitable for absorbing the centrifugal forces of the stranded conductors outside the lamination stack. The holding elements are here implemented as a simple ring, but also as a trough-shaped, cap-like element, which at least partially encloses the projections. Advantageously, additional fan blades are provided on the holding element, which can either be attached separately on the holding element or be already, for example, cast during the manufacturing process.

BRIEF DESCRIPTION OF THE DRAWINGS

The invention and additional advantageous implementations of the invention are shown in the illustrated exemplary embodiment. It is shown in.

DETAILED DESCRIPTION OF PREFERRED EMBODIMENTS

Figure 1:
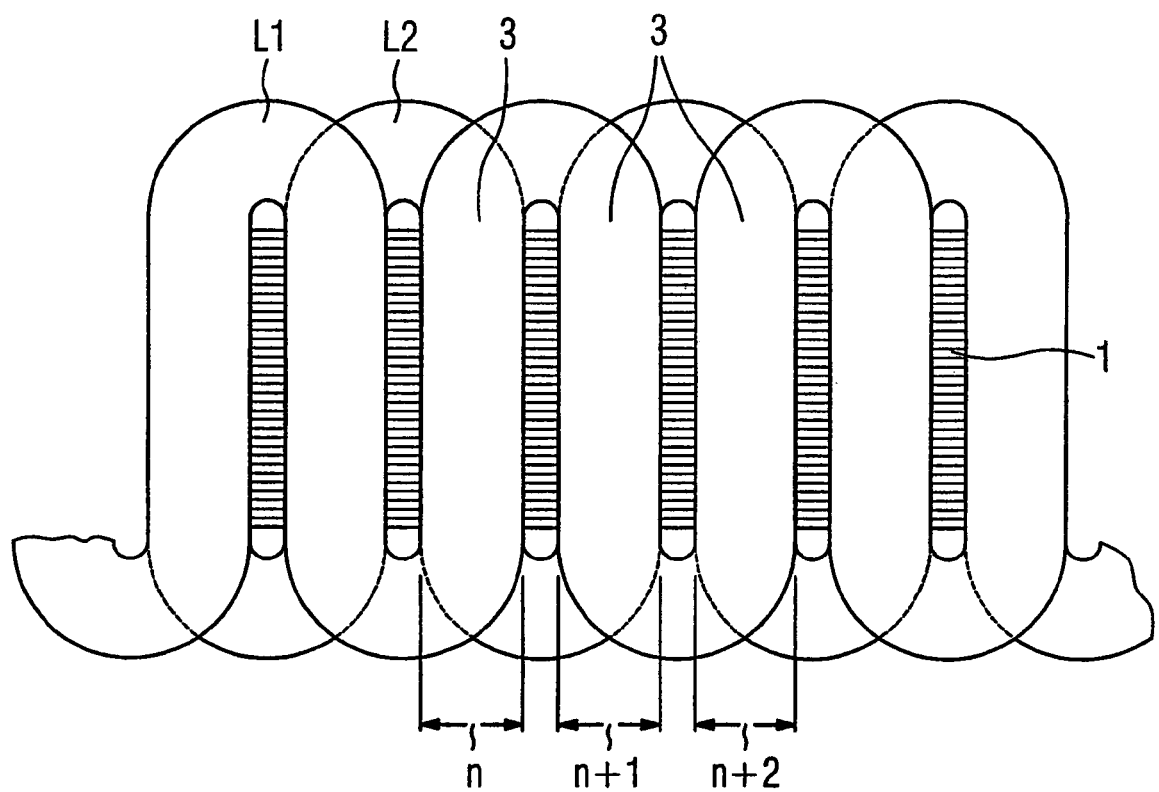
FIG. 1 schematically, a squirrel-cage rotor winding according to the invention, FIG. 2 a detail of the holding rings.
Figure 3:
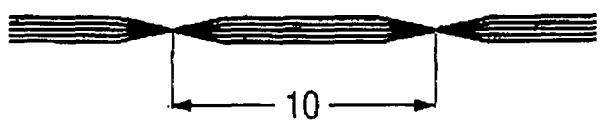
FIG. 3 a schematic depiction of a pitch of twisting of a stranded conductor.
Figure 4:
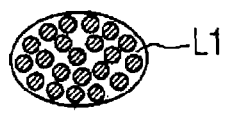
FIGS. 4–6 various cross sections of the stranded conductor.
Figure 5:
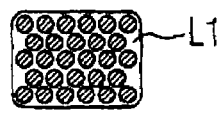
Figure 6:
Figure 7:
FIGS. 7–9 various cross sections of filaments of the stranded conductor.
Figure 8:
Figure 9:
Figure 10:
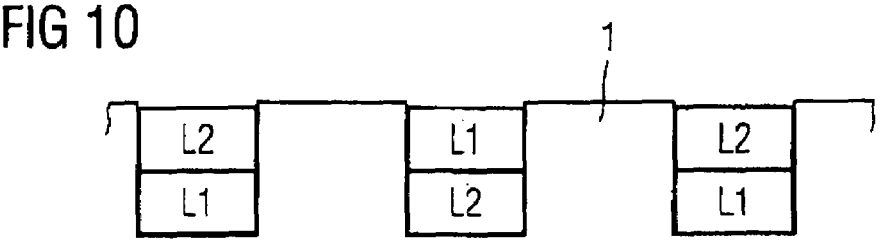
FIG. 10 an arrangement of stranded conductors in alternating pattern.

FIG. 1 shows, in an unrolled view, a squirrel-cage rotor with a lamination stack 1 that includes several exemplary slots n, n+1, n+2, which are machined out of the lamination stack 1. A conductor L2 is located in a lower layer of these slots and is wound in the opposite direction relative to a conductor L1 in an upper layer through the slots in a meander pattern. The conductors L1 and L2 are preferably stranded conductors consisting of individuals filaments. The stranded conductors are twisted with a predeterminable pitch 10, as shown by way of in FIG. 3.

Figure 13:
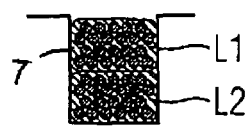
Figure 14:
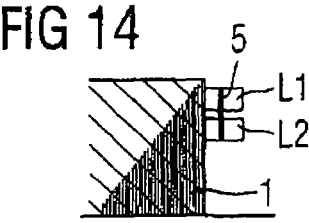

The conductors L1 and L2 are electrically contacted preferably by pressing on the preferably bare stranded conductors in the slots n, n+1, n+2. The slot walls hereby provide the required back pressure. However, other types of electric contacts are possible, for example, by a conducting potting compound 7, as shown in FIG. 13. which can be filled into the slots or into certain predeterminable axial slot regions, for example, after the conductors have been installed. This also fixes the stranded conductors in the slot. It is also possible to provide the electric contact between the stranded conductors L1, L2 immediately after the stranded conductors L1, L2 exit the lamination stack 1, as shown in FIG. 14.

The stranded conductors can also be electrically connected in these regions by melting them together.

Figure 12:
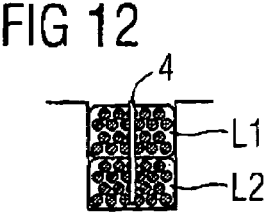
FIGS. 12–14 various illustrations of implementing an electric contact between stranded conductors.

In another embodiment, a mechanical contact can be provided by electrically conducting, mechanical elements 4 which can be, for example, driven into these regions, as shown by way of example in FIG. 12.

In yet another embodiment, at least sections of the stranded conductors located in a slot n, n+1, n+2 can be electrically connected by crimping. The stranded conductors are hereby pinched together or a conducting sheath surrounding the stranded conductors is pinched together at least in those regions to be contacted.

Advantageous, in particular with semi-open or closed slots n, n+1, n+2, the aforedescribed contacting operations can be performed in the regions 3, i.e., immediately after the conductors L1 and L2 exit from the lamination stack 1.

The design of the squirrel-cage according to the invention also eliminates the conventional cage ring. This also eliminates the related installation steps, and prevents vibration fatigue. A cage connection can be provided by an electrically conducting connection from L1 to L2. L1 and L2 can also be alternatingly arranged in an upper and a lower layer, or the conductors L1 and L2 can be arranged side-by-side in a slot. The entire squirrel-cage rotor winding can also be constructed from more than 2 stranded conductors, so that a greater number of stranded conductors can be placed in one slot n, n+1, n+2.

Figure 2:
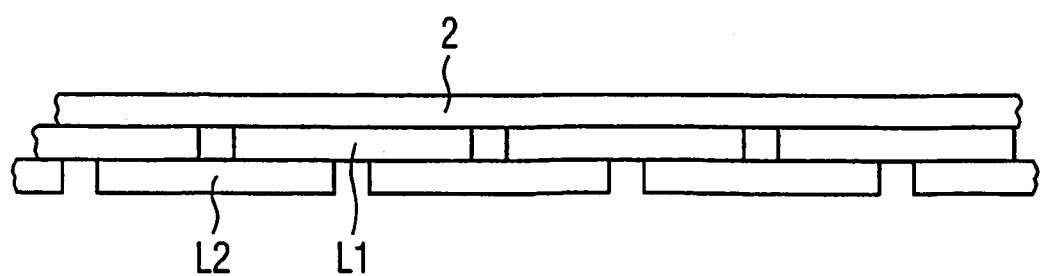
Figure 11:
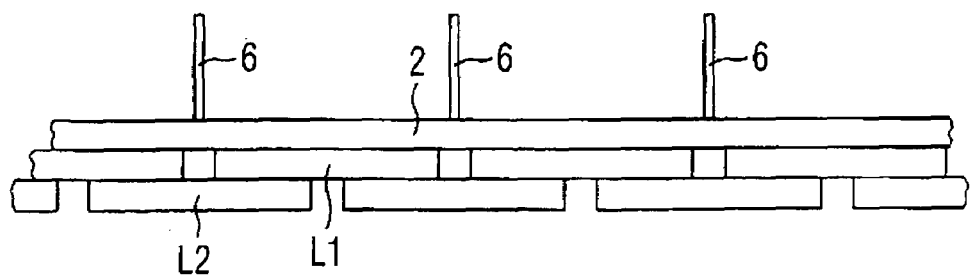
FIG. 11 an illustration similar to FIG. 2 with fan blades.

FIG. 2 shows a detail of the front face of the lamination stack 1. Since the projections of the squirrel-cage winding are now fabricated from stranded conductors, each of the conductors L1 and L2 is supported against centrifugal forces by a corresponding holding element, which is preferably implemented as a holding ring 2. In particular, the holding ring 2 is made of an electrically insulating material capable of absorbing the centrifugal forces. Pressed or pinched connections along sections can also be used to provide electric contact outside the lamination stack 1 in the region of the holding ring 2. As shown by way of example in FIG. 11, additional fan blades 6 can be provided on the holding element 2 and either be attached separately on the holding element 2 or already, for example, cast during the manufacturing process The stranded conductors are mechanically fixed, with respect to one another and/or on the holding element 2, by adhesive joints and/or tie down elements.

According to another embodiment, the stranded conductors are no longer routed in parallel outside the lamination stack 1. Each stranded conductors can then follow the shortest path to the next planned slot, whereby the next planned slot need not necessarily be the directly adjacent slot.

What is claimed is:

1. An electric machine, comprising a squirrel-cape rotor having a cage winding made of flexible conductors, wherein the flexible conductors are stranded conductors which are arranged in a meandering pattern, placed in opposite directions, in slots of the squirrel-cage rotor, so as to form a cage connection in the rotor, wherein the stranded conductors have filaments, said stranded wires conductors having different cross sectional configuration and their filaments having different cross sectional configuration.

2. The electric machine of claim 1 wherein the stranded conductors are twisted with a predeterminable pitch.

3. The electric machine of claim 1, wherein the cage winding of the squirrel-cage rotor includes more than two stranded conductors.

4. The electric machine of claim 3, wherein the stranded conductors are arranged in alternating pattern in an upper layer and lower layer of the slots.

5. The electric machine of claim 1 wherein the stranded conductors in a slot are in electric contact.

6. The electric machine of claim 5, wherein the stranded conductors are in electric contact through press-fitting in the slot.

7. The electric machine of claim 6, wherein the electric contact is established at least in a section of the stranded conductors.

8. The electric machine of claim 7, further comprising a conducting element driven into the section for establishing the electric contact between the stranded conductors in the slot.

9. The electric machine of claim 6, wherein the electric contact is established by a conducting potting compound filled in the slot.

10. The electric machine of claim 6, wherein the electric contact is established immediately after the stranded conductors exit the rotor.

11. The electric machine of claim 1, further comprising a holding element for keeping the stranded conductors in position.

12. The electric machine of claim 11, wherein the holding element is made of an electrically insulating material of high strength.

13. The electric machine of claim 11, wherein the holding element has a ring-shaped configuration.

14. The electric machine of claim 11, wherein the holding element has a trough-shaped, cap-like configuration.

15. The electric machine of claim 11, further comprising fan blades provided on the holding element.

16. An electric machine, comprising a squirrel-cage rotor having a cage winding made of flexible conductors, wherein the flexible conductors are stranded conductors which are arranged in a meandering pattern, placed in opposite directions, in slots of the squirrel-cage rotor, so as to form a cage connection in the rotor, wherein the stranded conductors have filaments, each of the stranded conductors and its filaments have different cross sectional configuration over a length thereof.

17. The electric machine of claim 16, wherein the stranded conductors are twisted with a predeterminable pitch.

18. The electric machine of claim 16, wherein the cage winding of the squirrel-cage rotor includes more than two stranded conductors.

19. The electric machine of claim 18, wherein the stranded conductors are arranged in alternating pattern in an upper layer and lower layer of the slots.

20. The electric machine of claim 16, wherein the stranded conductors in a slot are in electric contact.

21. The electric machine of claim 20, wherein the stranded conductors are in electric contact through press-fitting in the slot.

22. The electric machine of claim 21, wherein the electric contact is established at least in a section of the stranded conductors.

23. The electric machine of claim 22, further comprising a conducting element driven into the section for establishing the electric contact between the stranded conductors in the slot.

24. The electric machine of claim 21, wherein the electric contact is established by a conducting potting compound filled in the slot.

25. The electric machine of claim 21, wherein the electric contact is established immediately after the stranded conductors exit the rotor.

26. The electric machine of claim 16, further comprising a holding element for keeping the stranded conductors in position.

27. The electric machine of claim 26, wherein the holding element is made of an electrically insulating material of high strength.

28. The electric machine of claim 26, wherein the holding element has a ring-shaped configuration.

29. The electric machine of claim 26, wherein the holding element has a trough-shaped, cap-like configuration.

30. The electric machine of claim 26, further comprising fan blades provided on the holding element.

* * * * *